March 22, 1960
MITSUAKI HIROSE
2,930,030
APPARATUS FOR MEASURING AND INDICATING THE
VALUE OF A VARIABLE PHYSICAL QUANTITY
Filed Nov. 30, 1955
3 Sheets-Sheet 1
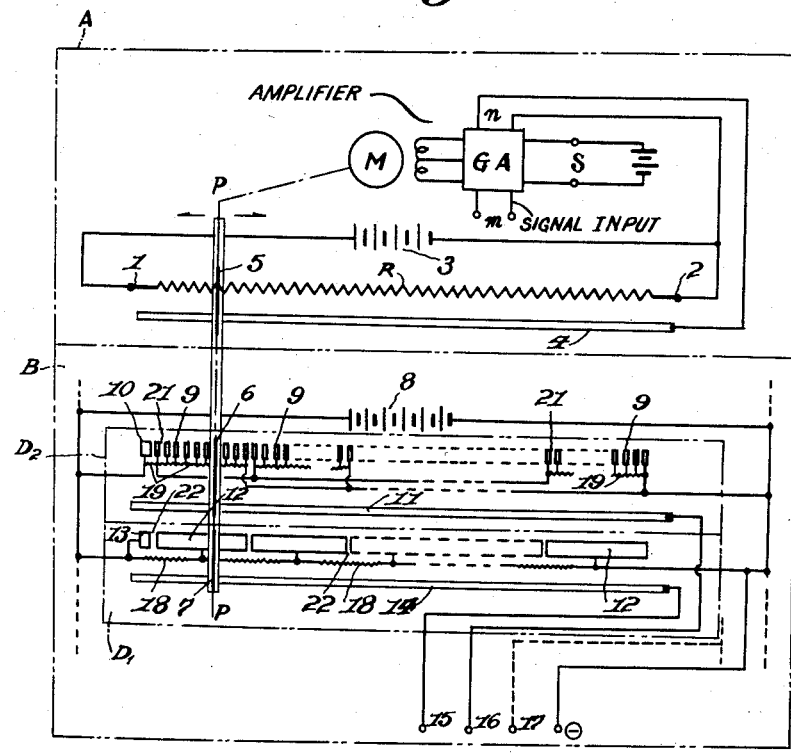
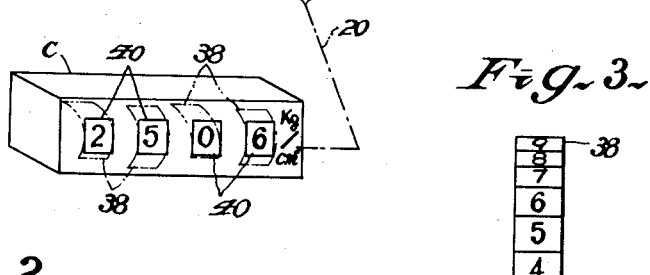
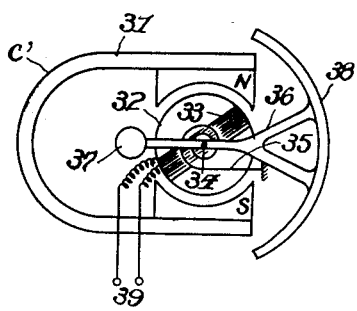

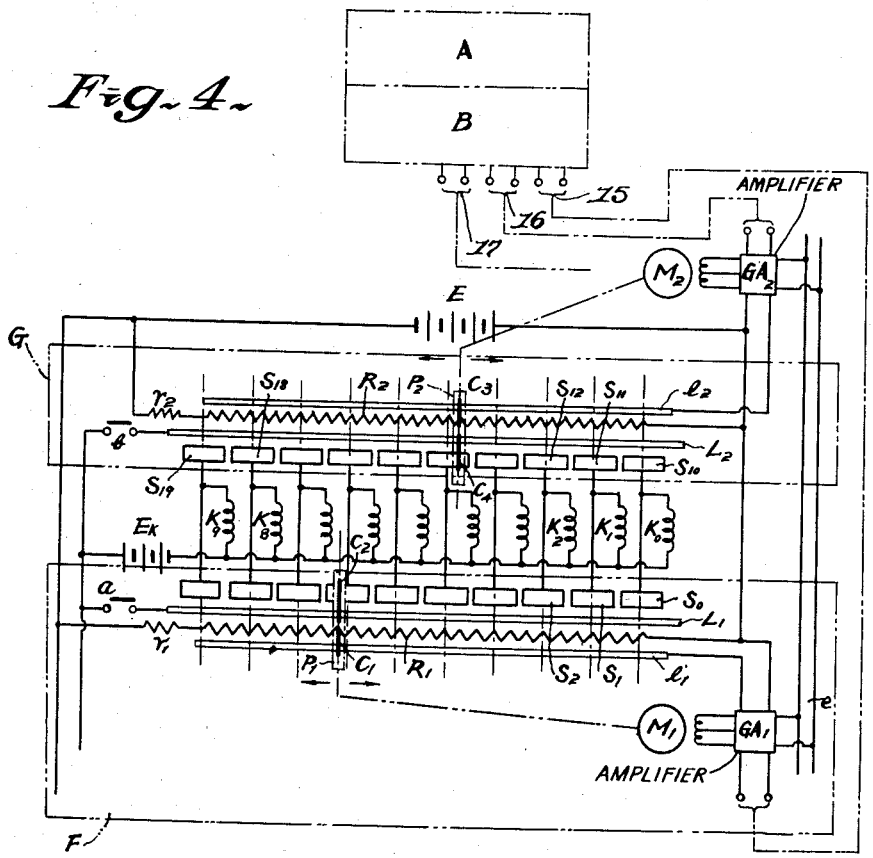
Fig-4-
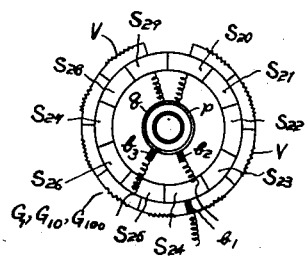
Fig-6-

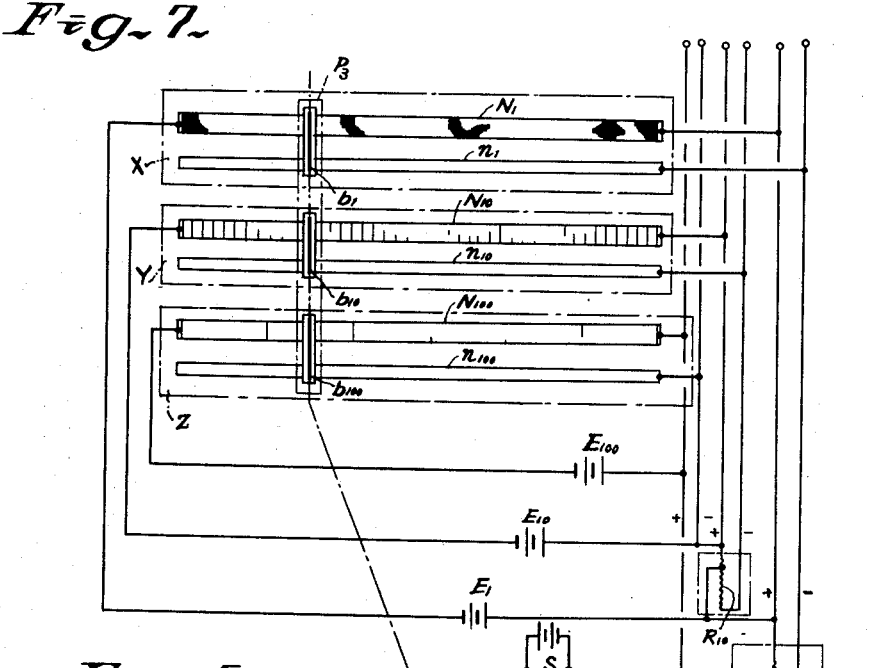
Fig-7-
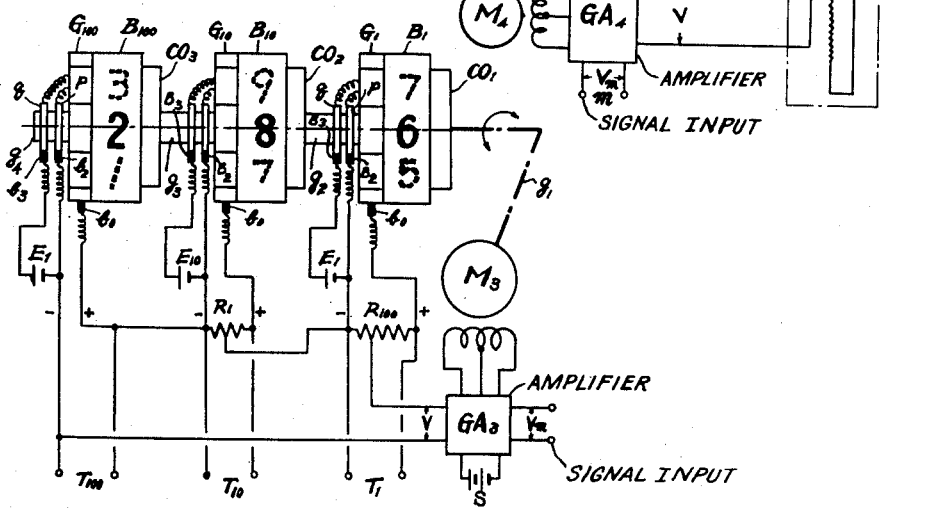
Fig-5-

United States Patent Office 2,930,030
Patented Mar. 22, 1960

2,930,030

APPARATUS FOR MEASURING AND INDICATING THE VALUE OF A VARIABLE PHYSICAL QUANTITY

Mitsuaki Hirose, Nagoya-shi, Japan

Application November 30, 1955, Serial No. 550,158

Claims priority, application Japan December 13, 1954

4 Claims. (Cl. 340—187)

This invention relates to remote measuring apparatus, more particularly to an electrical apparatus for measuring and visually indicating the value of a variable physical quantity.

The usual meters, such as pressure meters, thermometers, speedometers, voltmeters, etc., are of the indicating type in which the value of the physical quantity measured is pointed on a graduated scale or recorded in the form of lines on recording paper. In meters of this type, however, the following disadvantages are encountered:

(1) Personal errors caused by erroneous reading of the scale, introducing error in the measured amount.

(2) Errors caused by optical illusions will be introduced.

(3) Skill is required to read the scale of recording paper accurately and speedily.

(4) Recording of the measured amount is comparatively troublesome.

(5) Skilled personnel for taking measurements accurately and recording them is required.

(6) In order to obtain an accurate measurement, it is necessary to approach the meter so as to read the position thereof accurately, thereby measuring space is limited.

A principal object of the present invention is to provide a measuring apparatus of the type referred to that eliminates the above-mentioned disadvantages and effectuates an accurate and effective indication and/or recording of the physical quantity to be measured.

The principal object, and other objects, of the present invention, has been accomplished by the apparatus comprising, in combination, means for receiving a first voltage signal input representative of the instantaneous value of a variable physical quantity being measured and visually indicated in digital form or in other forms of rotation. A signal comparator receives the input and controls a reversible motor by a differential voltage signal derived at by comparing the input, and a second voltage signal generated under control of the motor by signal generating means comprising a source of power of constant predetermined voltage. The means for generating the second signal includes a plurality of commutators or decade units rotatably driven by the motor in opposite directions and which are electrically connected to the power source. Each commutator has a plurality of resistances of equal value which are connectable in different combinations in series when the commutators are rotatably driven, thereby to evolve the second signal which is compared with the input signal representative of the physical quantity. The generating means is connected with a plurality of voltage dividers receptive of the second signal for reducing it to predetermined different ratios before it is impressed on the comparator means. The decade units have numerical indicia for visually indicating the magnitude of the quantity measured, and speed responsive means are provided for clutching or coupling the decade units to indicate the physical magnitude in accordance with predetermined higher and lower digital orders.

The novel features which I believe to be characteristic of my invention are set forth with particularity in the appended claims. My invention itself, however, both as to its organization, manner of construction, and method of operation, together with further objects and advantages thereof, may best be understood by reference to the following description, taken in connection with the accompanying drawings, in which:

Fig. 1 is a diagrammatic view of an example of the present invention.

Fig. 2 is a plan view of an indicator element to be used in the example shown in Fig. 1.

Fig. 3 is a front view of an indicating plate of the indicator element shown in Fig. 2.

Fig. 4 is a diagrammatic view of an example of a typing recorder to be used in the present invention.

Fig. 5 is a diagrammatic view of another example of a first digit detector to be used in the present invention.

Fig. 6 is a front view of the first digit detector shown in Fig. 5.

Fig. 7 is a diagrammatic view of an improvement of the apparatus illustrated herein.

Referring now to Fig. 1, the indicating apparatus consists of an automatic balancing device A provided with a driving member for driving a movable brush supporter $p$ to a desirable position being in proportion to the amount to be measured, a first digit detector B capable of dividing the said amount into an amount of one figure, amount of two figures, etc., in accordance with displacement of the brush supporter $p$, and converting each value of the said amounts into a voltage which is a time-integral of the unit electric voltage, and an indicator C. In this illustration there is used an automatic device of the potentiometer type as the balancing device A. The device is composed of a straight (or circular) resistance R of the potentiometer type and is provided with terminals 1 and 2, a contact bar 4, a slidable brush 5 which is slidable along the resistance R and contact bar 4, a standard electric source 3, an amplifier or signal comparator GA, a reversible electric motor M, and a brush supporter $p$ which supports the brush and is driven by the motor M so as to make the brush slide along the resistance R and contact bar 4. The amplifier GA is provided with connection terminals $s$ connected with an electric source as shown, input terminals $m$ supplied with an electric voltage which is proportional to the amount to be measured, output terminals connected to exciting or field coil of the said motor M, and input terminals $n$ supplied with the output voltage of the potentiometer composed of the resistance R, contact bar 4 and brush 5. The motor M and amplifier GA are so designed and connected that the differential voltage between input voltages at the input terminals $m$ and $n$ may be shifted by the motor M when it is excited with the differential voltage until the output voltage of the potentiometer, the said voltage corresponding to the position of the brush 5, is brought in balance with the input voltage at the input terminals $m$.

Accordingly, when relation between the displacement of the supporter $p$ and the driving speed of the motor M is suitably selected, the stop position of the brush 5 is in proportion to the amount to be measured.

The first digit detector B is composed of two detector elements $D_1$ and $D_2$. The detector element $D_1$ is composed of a series of many contact segments 12 arranged along a straight (or circular) line and provided with air gap 22 or insulating piece between them, a potential divider 18 which is connected to each of the said contact segments 12 at equally spaced points thereof. Both terminals of the divider 18 are connected to a standard electric source 8 and one terminal thereof is connected to a minus (—) terminal. A stationary contact bar 14 is connected to an output terminal 15 at its one end, and a brush 7 is supported by the supporter $p$ so as to be slidable along the contact segments 12 and the contact bar 14. The detector element $D_2$ is composed of a series of many contact segments 9 arranged along a straight (or circular) line and provided with an air gap 21 or insulating piece between them. The width of the said segments is equal to one-tenth of that of the contact segment 12. The detector element $D_2$ further comprises a stationary contact bar 11, and potential dividers 19. Each of the dividers is connected to successively arranged ten contact segments 9 at equally spaced points thereof and the dividers are connected in parallel to a standard electric source 8. The parallel connection is directly made at one end and is made through an end contact segment 10 at the other end of each of the said dividers 19. One end of the said contact bar 11 is connected to an output terminal 16.

When the first digit detector B is to be constructed in accordance with a decimal system, digits corresponding to the contact segments 12 and 9 are, respectively, selected as ten and one hundred, each series of successive ten segments of the segments 9 being attached to one potential divider 19. The detector element $D_1$ corresponds to a second digit detector and another element $D_2$ corresponds to a third digit detector.

The illustration in Fig. 1 relates to an apparatus provided with only two detector elements corresponding to a first digit and a two digit detector element, but it may be modified so as to include a third digit detector element.

For example, when a third digit detector element is used, this element is composed of ten contact segments, contact bar, potential divider, and brush which correspond to the contact segments 12, contact bar 14, potential divider 18, and brush 7, respectively.

In this case, the width of the contact segment of the third digit detector element is selected so as to be equal to ten times that of the contact segment 12 and the output terminal 17 is used for leading out the output voltage of the third digit element. Similarly, it may be provided with fourth or more detector elements.

In Figs. 2 and 3, there is shown an illustrative construction of an element $C'$ of the indicator C. Referring to Fig. 2, the indicator element $C'$ is composed of a permanent magnet 31, an iron core 32, a moving coil 33 which is wound around the core and is supplied at its input terminals with an output voltage detected by the detector B, a balancing spring 35, an arcuate figure plate 38 having equally spaced thereon figures 0–9, as shown in Fig. 3, and supported by a moving arm 36 which is fixed to the rotary shaft 34 of the moving coil 33. A counter weight 37 is provided for balancing the weight of the plate 38. The indicator C is constructed, as shown in Fig. 1, by arranging the indicator elements, the number thereof being equal to the number of digit detector elements, in a case provided with windows so that only one figure may be exposed at the window. On terminal of the terminals 39 of each of the indicator elements is respectively connected to each of the terminals 15, 16, 17, in Fig. 1, and the other terminals of the indicator elements are connected in common to the (—) terminal in Fig. 1.

Operation of the apparatus illustrated in Figs. 1–3 will be described in connection with the case in which pressure of a pressure meter is to be measured.

When the electric voltage obtained by converting the displacement of the pressure meter with a suitable device into an electric quantity is supplied to the input terminals $m$ of the automatic balancing device A, the balancing motor M rotates clockwise or counterclockwise in accordance with the detected output power of the amplifier GA, thereby the brush supporter $p$ and the brush 5 are driven. Then, between the terminal 2 and the contact bar 4, there is obtained an electric voltage corresponding to the position of the brush 5. The voltage obtained is compared to the voltage fed from the terminal $m$ in the amplifier GA. If the differential voltage between them is zero, the motor M stops and makes the brush 5 stop.

If there is any difference between the said voltages, the motor M rotates until the said differences becomes zero.

Accordingly, the stopped position of the brush 5 is in proportion to the input voltage at the terminals $m$, that is, corresponds to the pressure or variable quantity to be measured.

On the other hand, if the voltage of the standard electric source 8 is taken as 100 v., divisional voltages of the contact segments 12 are successively 0 v., 10 v., 20 v. ... 80 v., 90 v., from the rightmost segment and the voltage of the leftmost segment 13 is 100 v. Voltage distribution of one group composed of successive contact segments 9 is the same with that of a series of the contact segments 12. Accordingly, in a balanced position of the supporter $p$, when the brush 7 is brought into contact with the third contact segment 12 from the right and the brush 6 is brought in contact with the sixth contact segment 9 of one group thereof, the output voltages of the detectors $D_1$ and $D_2$ becomes 20 v. and 50 v., respectively. As will be understood from the above description, the output voltages taken at the brushes 7 and 6 are time-integral as large as the unit voltage obtained by dividing the voltage of the standard source 8 in the detectors $D_1$ and $D_2$.

Accordingly, the moving arm 36 of the indicator element $C'$ at the brush 7 or 6, can be intermittently operated by the said output voltage obtained, thereby a figure on the plate 38 which corresponds to a respective unit will be accurately indicated at the window 40 of the indicator casing. In this case, any intermediate indication will not occur.

In the said illustration, ten successive contact segments 9 are faced to one contact segment 12 and one-tenth of the voltage at the contact segment 12 can be led out into the indicator element $C'$, so that the amount corresponding to small displacement which is equal to one-tenth of the length of the contact segment 12 can be measured.

The above illustration relates to a decimal system, but this invention may be applicable for a dyadic system or any other system of rotation.

For balancing the positions of the brushes 6 and 7, besides the potentiometer type balancer illustrated, other balancing systems may be used. For example, the supporter $p$ supporting the brushes 6 and 7 may directly be driven by the moving part of the meter, such as a pressure meter, thermometer or other meters. Furthermore, when any recorder is combined with the balancing motor M or with variable balancing voltage, a numerical indication can be carried out while recording the amount to be measured.

In carrying out the present invention, when the output voltage obtained by a digit detector is insufficient for operating the digit indicator, it is preferable to insert a suitable amplifier between the digit detector and numeral indicator.

As the measuring indicator of the present invention, a typing recorder which types figures on a tape as if it were a typewriter may be used instead of the indicator C illustrated in Figs. 1–3. Such an example is illustrated in Fig. 4, in which the devices corresponding to the devices A and B in the form shown in Fig. 1, are shown by mere outline, due to the fact that they are identical.

Referring to Fig. 4, F and G are typing recorders for typing figures representative of measurements, corresponding to one digit and amounts corresponding to two digits respectively. The recorder F is composed of a straight (or circular) resistance $R_1$ of the potentiometer type which is supplied with an electric voltage from a standard source E, contact bars $L_1$ and $l_1$, a series of ten contact segments $S_0$, $S_1$ ... $S_9$ provided with air gap or insulating piece between them. The series of contact segments and contact bars $L_1$ and $l_1$ are arranged along the resistance $R_1$, a resistance $r_1$ connected to the said resistance $R_1$ in series, slidable brushes $C_1$ and $C_2$ which are supported by a common supporter $p_1$ so as to be slidable along the resistance $R_1$ and contact bar $l_1$, and along the contact segments $S_0 \ldots S_9$ and contact bar $L_1$, respectively, a reversible electric motor $M_1$ driving the said supporter $p_1$, and an amplifier GA, which amplifies the differential voltage between the output voltage of the potentiometer type resistance $R_1$ and the output voltage at the terminals 15, which corresponds to two digits to be measured and supplies the motor $M_1$ with the said amplified voltage.

The motor and amplifier are so designed that the supporter $p_1$ may be shifted by the motor until the output voltage of the potentiometer type resistance $R_1$ is brought in balance with the voltage at the terminals 15. Accordingly, when the relation between the shifting distance of the supporter $p_1$ and the driving speed of the motor $M_1$ is suitably selected, the stop position of the brush $C_1$ is in proportion to two digits representative of the quantity to be measured.

Each of the contact segments $S_0 \ldots S_9$ is connected to one pole of an electric source $E_k$ through a respective typing magnet $K_0, K_1, K_2, \ldots K_8$, or $K_9$. The other pole of the source is connected to the left end of the contact bar $L_1$ through a switch $a$ so that when the switch $a$ is closed the electric circuit of the magnet connected to the contact segment which is in contact with the contact bar $L_1$ will be closed through the brush $C_2$ and the said magnet is operated.

Each of the magnets is provided with a respective typing mechanism, not shown, which types a predetermined figure on a recording tape when the corresponding magnet is excited. Accordingly, the figure corresponding to the brush position can be typed on the recording tape.

The typing recorder G is composed of members $R_2, l_2, L_2, S_{10}-S_{19}, P_2, C_3, C_4, r_2, b, M_2, 16$, and $GA_2$, which correspond to the members $R_1, l_1, L_1, S_0-S_9, p_1, C_1, C_2, r_1, a, M_1, 15$ and $GA_1$, in the typing recorder F, respectively. The operation of the recorder G is also the same as that of the recorder F, but the recorder G is used to type the digit quantities to be measured.

As will be understood from the above description, when the switches $a$ and $b$ are closed alternatively by a suitable means, such as a clock mechanism, the figures corresponding to quantities represented by two digits and one digit will successively be typed on the recording tape.

In the embodiment of the illustration in Fig. 4, the electric source of the apparatuses A and B may be used as the electric source E and also the magnets may be used for perforating the tape to indicate figure by perforations thereof.

The above description relates to only typing of amounts of one digit and two digits, but quantities represented by the three digits and more may be typed by providing more typing recorder or recorders, such as records G and F and by using output terminals 17, etc.

In the embodiment of the present invention, the apparatus shown in Figs. 5 and 6 may be used as the digit indicator.

Referring to Figs. 5 and 6, each of the commutators $G_1, G_{10}$, and $G_{100}$, is composed of mutually insulated ten segments $S_{20}, S_{21}, \ldots S_{29}$, a rotary shaft $g_2, g_3$ or $g_4$, slip rings $p$ and $q$ attached to the shaft, a brush $b_0$, which is in contact with the said commutator, and brushes $b_2, b_3$, which are in contact with the said slip rings. The said segments $S_{20}-S_{29}$ are connected to equally spaced points of a resistance $r$ which is connected to the segments $S_{20}$ and $S_{29}$ at both terminals and the $S_{20}$ and $S_{29}$ are connected to the slip rings $p$ and $q$, respectively, as clearly shown in Fig. 6. The commutators $G_1, G_{10}$, and $G_{100}$ are provided with respective ring-shaped decade units $B_1, B_{10}$ and $B_{100}$, respectively. The decade unit $B_1$ is fixed directly or through any coupler to the commutator $G_1$ so as to be synchronously driven by the commutator $G_1$. Similarly, the decade units $B_{10}$ and $B_{100}$ are driven by the commutators $G_{10}$ and $G_{100}$, respectively. To the shafts of the said commutators are, respectively, attached step driving gear $CO_1, CO_2$ and $CO_3$ such as Geneva gear, each of the said gears $CO_2$ and $CO_3$ being driven by the preceding shaft and the said gear $CO_1$ being driven by the shaft $g_1$ hereinafter described, so that each of them may be rotated by an angle of 36° per one rotation of the said driving shaft.

Between the brushes $b_2$ and $b_3$ is connected a standard source $E_1$, so that at the terminals $T_{100}, T_{10}$, and $T_1$ can be obtained output voltages of the commutators $G_{100}, G_{10}$, and $G_1$, respectively, each of the said output voltages corresponding to the rotary position of respective commutator.

Between the brushes $b_0$ and $b_2$ of the commutator $G_{10}$ is connected in parallel with a potential divider $R_{10}$ which steps down the voltage to one-tenth thereof.

Between the brushes $b_0$ and $b_2$ of the commutator $G_1$ a potential divided $R_{100}$, which steps down the voltage to one-hundredth thereof is connected in parallel.

Accordingly the voltage V is resultant of a voltage of three figures between the brushes $b_0$ and $b_2$ of the commutator $G_{100}$, an output voltage of two figures number at the potential divided $R_{10}$, and an output voltage of one figure number at the potential divider $R_{100}$.

The said voltage V and the voltage $V_m$ which corresponds to the voltage of the terminals $m$ in the illustration in Fig. 1 are fed into an amplifier $GA_3$, which acts to amplify the differential voltage between the said voltages V and $V_m$, the operation voltage of the said amplifier being supplied from an electric source S. The amplified differential voltage is supplied to the reversible electric motor $M_3$ so as to rotate the said motor in proportion to the said differential voltage, the shaft $g_1$ of the motor being connected to the gear $CO_1$.

Operation of the apparatus shown in Figs. 5 and 6 is as follows. The apparatus is first adjusted so that when $V_m$ is zero, the motor $M_3$ may be set in stationary position and all of the commutators $G_1, G_{10}$, and $G_{100}$, may be set in their zero positions in which their output voltages are zero.

When the voltage $V_m$ takes a value, an output voltage corresponding to the difference between the voltages $V_m$ and V is supplied to the motor $M_3$, thereby the motor rotates and drives the gear $CO_1$ through the gear shaft $g_1$. Accordingly, the commutator $G_1$ rotates and its output voltage appears at the potential divider $R_{100}$.

Upon the difference between the voltages $V_m$ and V, becoming zero, the motor $M_3$ stops and the commutator $G_1$ is maintained at its adjusted position, the position being indicated by a figure on the decade unit $B_1$, because of rotation of the unit together with the commutator $G_1$.

When the output voltage of the potential divider $R_{100}$ which is obtained by one rotation of the commutator $G_1$ is insufficient to balance the voltage $V_m$, the commutator $G_{10}$ is rotated by one step per one rotation of the commutator $G_1$ until the difference between the voltages $V_m$ and V becomes zero, thereby the motor $M_3$ stops.

Coupling relation between the commutators $G_{100}$ and $G_{10}$ is the same as that between the commutators $G_{10}$ and $G_1$, so that the description of the former is omitted herewith.

As previously described, the commutators $G_1, G_{10}$ and $G_{100}$ correspond to quantities represented by one digit, two digits and three digits, respectively, so that the quantity measured will be accurately indicated by figures on decade units $B_1, B_{10}, B_{100}$.

In the illustration in Figs. 5 and 6, when telemeasuring is desirable, indicator elements such as the element C' illustrated in Fig. 1 may be connected to the terminals $T_{100}, T_{10}$ and $T_1$.

On the other hand, the said terminals $T_{100}, T_{10}$ and $T_1$ may be connected to such figure typing recorders as illustrated in Fig. 4 to type figures on a recording tape or tapes.

In the illustration in Figs. 5 and 6 there is a disadvantage that when a number of three digits is to be indicated a relatively long period of time will be required to indicate the amount, because the motor speed is within a predetermined limit.

The above-mentioned disadvantage can be avoided by extending the driving shaft $g_1$ through the commutators $G_{10}$ and $G_{100}$, and providing a centrifugal coupling between each of the said commutators and the shaft $g_1$. The said couplings act to couple the shaft $g_1$ directly with the commutators $G_{10}$ and $G_{100}$ upon exceeding of the motor speed over a predetermined high speed, thereby balancing operation, that is, indicating operation will be sped up.

The above-mentioned illustrations in Fig. 1, if the relative positions of the slidable brushes supported by a common supporter are not completely coincident, an erroneous indication will occur, for example, 409 or 599 may be erroneously indicated as 499.

In general, it is very difficult and expensive to design and manufacture apparatus so as to obtain a complete coincidence between the positions of brushes supported by a common supporter.

According to the present invention, the last-mentioned disadvantage can effectively be avoided by such improvement of the digit detector composed of a potentiometer type resistance, a contact bar and a brush which slides along the said members, as will be hereinafter described in connection with the illustration in Fig. 7.

Referring to Fig. 7, the three digit detector Z which detects three digit voltages corresponding to a time-integral of the unit voltage, is composed of a detector element $N_{100}$ of the potentiometer type, a contact bar $n_{100}$ and a brush $b_{100}$, which slides along the members $N_{100}$ and $n_{100}$. Similarly, the two digit detector Y is composed of a detector element $N_{10}$ of the potentiometer type, a contact bar $n_{10}$ and a brush $b_{10}$, which slides along the said members $N_{10}$ and $n_{10}$, and the one digit detector X is composed of a detector element $N_1$, of the potentiometer type, a contact bar $n_1$ and a brush $b_1$, which slides along the said members $N_1$ and $n_1$. The brushes $b_{100}$, $b_{10}$ and $b_1$ are supported by a brush supporter $p_3$, and the detector element $N_{100}$, $N_{10}$ and $N_1$ are, respectively connected to the standard voltage sources $E_{100}$, $E_{10}$ and $E_1$, in series. The voltages of the last-mentioned sources are equal.

The construction, connection and operation of each of the detectors are the same as those of the detectors $D_1'$ and $D_2$ in the illustration in Fig. 1. The supporter $p_3$ is driven by a balancing reversible motor $M_4$, which is supplied with the output voltage of an amplifier $GA_4$. The amplifier amplifies the differential voltage between the voltage $V_m$ which is proportional to the quantity to be measured and the detected voltage V. The voltage V corresponds to the resultant of the output voltage of the detector Z, output voltage of a one-tenth step down resistance $R_{10}$, and output voltage of another one-hundredth step down resistance $R_{100}$. The resistance $R_{10}$ is supplied with the output voltage of the detector Y and the resistance $R_{100}$ is supplied with the output voltage of the detector X.

In the illustration in Fig. 7, when the voltage $V_m$ is equal to the voltage V, the output voltage of the amplifier $GA_4$ is zero and the motor $M_4$ takes stationary condition. Now, when it is assumed that the brush positions correspond to, for example, 84.6 kg. and voltages of the standard sources $E_{100}$, $E_{10}$ and $E_1$ are equal to 10 v., the output voltages of the detectors Z, Y and X are 8 v., 4 v. and 6 v., respectively.

Accordingly the voltage V becomes 8.46 v., because the output voltage of the resistances $R_{10}$ and $R_{100}$ are 0.4 v. and 0.06 v., respectively.

The said voltage V is equal to the voltage $V_m$ which is correspondent to the amount to be measured because of balancing of the said voltages V and $V_m$. As a result, each of the output voltages of the detectors Z, Y and X which are detected by the positions of the brushes $b_{100}$, $b_{10}$ and $b_1$ indicate each of one figure, two figures and three figures amount to be measured, the said detected amounts, can easily be led out through the terminals $T_{100}$, $T_{10}$ and $T_1$ to a digit indicator and/or a figure typing recorder.

According to the illustration in Fig. 7, when erroneous detection occurs due to erroneous brush position or positions, for example, when a true value 499 is detected as 409 or 599, then extraordinary differential output voltage occurs in the amplifier, thereby the brush supporter will forcibly be driven so as to effect balancing surely and speedily.

While I have described particular application of my invention, it will, of course, be understood that I do not wish to be limited thereto, since many other applications and modifications may be made without departing from the principal object of the present invention.

I claim:

1. Apparatus for measuring and visually indicating the value of a variable physical quantity, in combination, means for receiving a first voltage signal input representative of the instantaneous value of a physical quantity being measured, a reversible electric motor, signal comparator means operably connected to said first signal receiving means thereby to receive said first signal and including means operably coupled to the motor for causing it to rotate in one of both directions when a difference between the first voltage signal and a second voltage signal impressed thereon occurs and to stop rotation of said motor when the second voltage signal corresponds to the first voltage signal, means under control of the motor for generating the second voltage signal comprising a source of power having a predetermined voltage, a plurality of commutators rotatably driven by said motor in both directions and electrically connected to said source of power, shaft means operably connecting the motor to said commutators for driving them, each commutator comprising a plurality of resistances of equal value, means for connecting successively different combinations of said resistances in series with said power source when the commutators are driven thereby to provide the second voltage signal input to said comparator means, a plurality of voltage dividers receptive of said second signal connected to impress the second voltage signal on said comparator means each operably associated with a corresponding commutator and each having a predetermined different resistance for reducing the second input voltage predetermined different ratios thereof before it is impressed on said comparator, said voltage dividers being less in number than the commutators, each commutator having numerical indicia for directly, visually indicating the value of said physical quantity, and means comprising gears operably connecting the commutators with one another for causing them to be successively and jointly driven in correspondence with predetermined digital lower and higher orders for continuously displaying the instantaneous value of said variable physical quantity and to cause said means for connecting said resistances in different combinations, to connect the resistances in combinations to provide commutator outputs in accordance with said digital orders.

2. Apparatus according to claim 1, in which said means operably connecting the commutators comprises centrifugal clutches between the individual commutators for connecting them in dependence upon the speed at which they are driven.

3. Apparatus according to claim 1, in which said means operably connecting the commutators with one another comprises speed-responsive means between the individual commutators for clutching them for joint rotation thereof in dependence upon a predetermined difference in value between the first and second signals.

4. Apparatus according to claim 1, in which the commutators operably associated with the voltage dividers are decade units and in which said voltage dividers divide the output of the associate commutators in ratios of 1/10 and 1/100 thereby the corresponding commutators are tens and unit decade units, and in which said commutators have decimal digits peripherally thereon for indicating the value of the physical quantity in a decimal equivalent with decimal digits magnitude-related to the value of the physical quantity.

References Cited in the file of this patent

UNITED STATES PATENTS

| | | |
|---|---|---|
| 2,497,961 | Shaw | Feb. 21, 1950 |
| 2,547,035 | McWhirter et al. | Apr. 3, 1951 |
| 2,584,957 | Williams | Feb. 5, 1952 |
| 2,591,555 | Klopf | Apr. 1, 1952 |
| 2,603,702 | Kern | July 15, 1952 |
| 2,700,076 | Goode | Jan. 18, 1955 |
| 2,775,754 | Sink | Dec. 25, 1956 |